D. P. MATHEWS.

Tree-Protector.

No. 57,937. Patented Sept. 11, 1866.

Witnesses.
Samuel N. Piper.
George Andrews.

Inventor.
D. P. Mathews.
by his Attorney.
R. H. Eddy.

UNITED STATES PATENT OFFICE.

D. P. MATHEWS, OF WINTHROP, MASSACHUSETTS.

IMPROVEMENT IN TREE-PROTECTORS.

Specification forming part of Letters Patent No. 57,937, dated September 11, 1866.

*To all whom it may concern:*

Be it known that I, DAVID P. MATHEWS, of Winthrop, in the county of Suffolk and State of Massachusetts, have invented an Improved Tree-Protector; and I do hereby declare the same to be fully described in the following specification, and represented in the accompanying drawings, of which—

Figure 1:
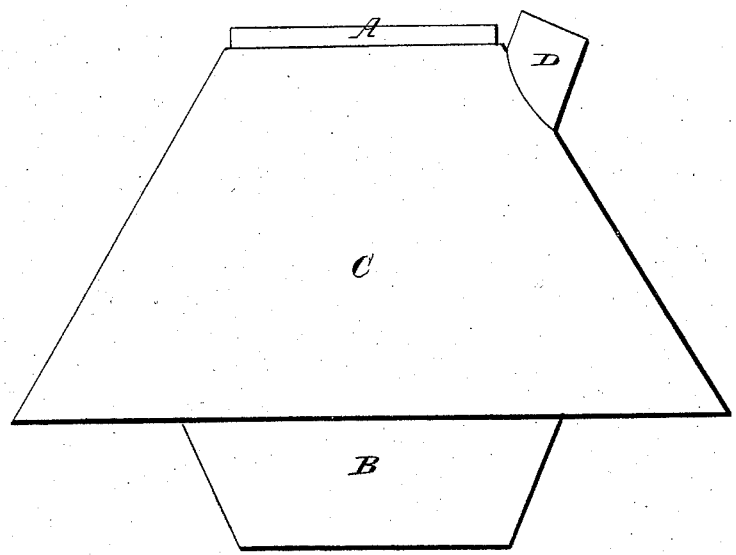
Figure 2:
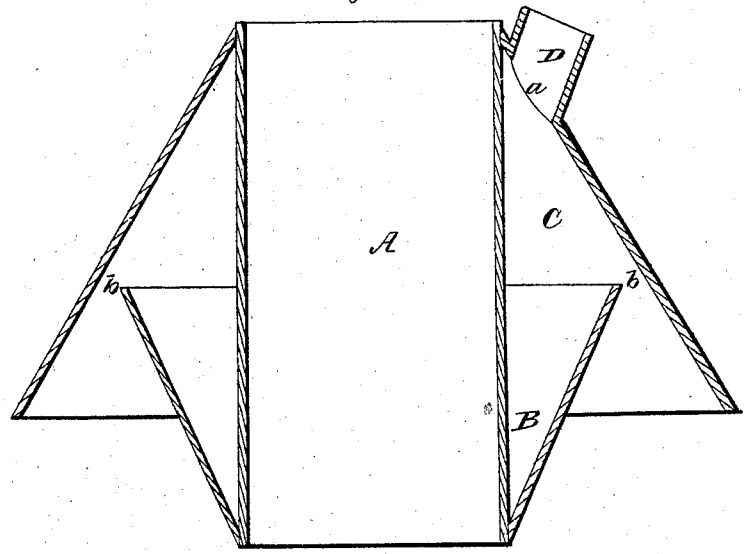

Figure 1 is a side elevation, and Fig. 2 a vertical section, of it.

The said tree-protector I construct of a cylinder or tube, A, and two hollow conical frusta, B C, and a supply-tube, D, arranged with respect to each other, as seen and represented in the said drawings.

The frustum B is inverted—that is, it has its smaller base downward and its larger base extended within the frustum C. The smaller bases of the two frusta are to be soldered to the tube A, which, when the protector is in use, is to encompass the trunk of a tree and with a stuffing of wool or other proper material interposed between such tree and such tube.

A tube, D, is to be applied to an opening, *a*, made through the upper part of the frustum C, and directly over the frustum B, so that when a liquid is poured into the said tube D it will flow into the frustum B, which makes a trough around the tube A.

The whole of the said tree-protector I usually make of tinned plate. I first bend around the tree a plate to form the tube A, and solder its overlapping edges together, after which I apply to such tube the pieces to form the frusta B and C, and unite the whole by means of solder, the tube D being fixed to the frustum C, subsequently or before, as may be most convenient.

There should be an annular space, *b b*, between the larger base of the frustum B and the contiguous inner surface of the frustum C, and such space should be sufficiently wide to prevent a worm or grub from passing from the frustum B to the frustum C.

A liquid is to be placed in the frustum B and about the tube A. The frustum C will answer as a roof to cover such liquid. As the frustum C is to be made of planished tin plate it will reflect the rays of the sun, which may fall on it and prevent them from striking upon and evaporating the liquid.

The tube D enables the trough to be supplied with the liquid whenever it may be required.

In case it may be necessary at any time to cleanse the trough of liquid or grubs, a hot iron may be so applied to the solder connecting the frustum C with the tube A as to melt such solder, after which the frustum may be raised so as to enable access to be had to the trough. After the trough may have been duly cleansed the cover C may be restored to place and resoldered to the tube A. These operations will generally have to be done but once a year, and can be accomplished with great ease.

This tree-protector I have applied to many trees and found it to be entirely efficient in arresting the grubs. My trees are now in excellent condition and free from worms, while others in the immediate vicinity of them, and on which other well-known tree-protectors are used, are suffering greatly from these pests of the farmer.

I do not claim a trough going around the trunk of a tree and provided with a conical roof or cover placed over it and around the said trunk, as I am well aware that this is a well-known mode of constructing a tree-protector.

What I claim as my invention is—

My improved tree-protector, made as described, viz., of the tubes A D and the two conic frusta B C, arranged and applied with respect to each other, as specified.

DAVID P. MATHEWS.

Witnesses:
R. H. EDDY,
F. P. HALE, Jr.